W. F. & J. BARNES.
Mechanical Movement
No. 164,413.  Patented June 15, 1875.
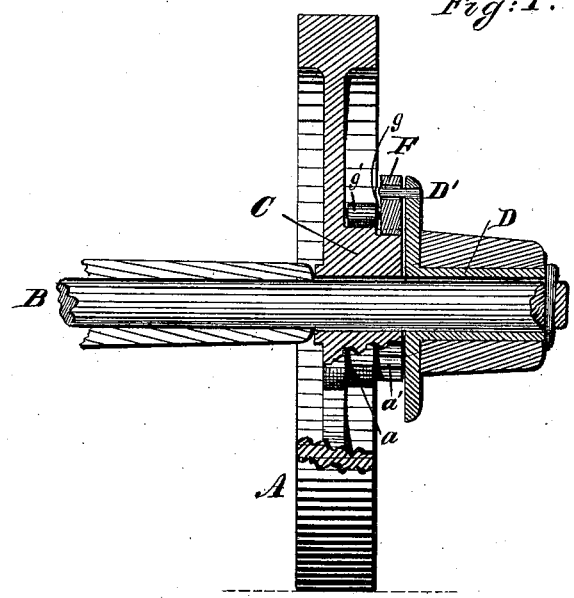
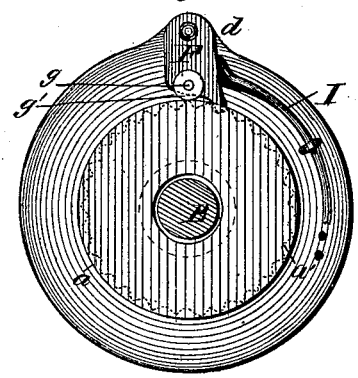
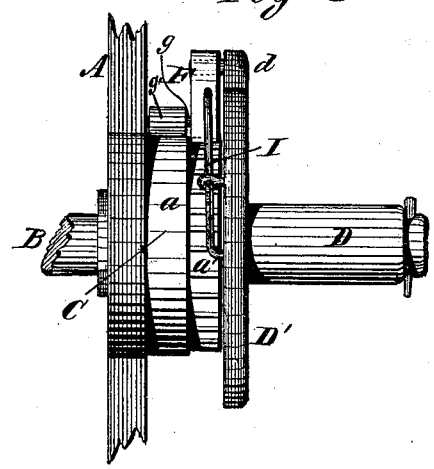
WITNESSES
H. H. Young
Wm J. Peyton
INVENTORS
Wm F. and John Barnes.
By their Attorney
Wm D. Baldwin
THE GRAPHIC CO.PHOTO-LITH.39 & 41 PARK PLACE,N.Y.

UNITED STATES PATENT OFFICE.

WILLIAM F. BARNES AND JOHN BARNES, OF ROCKFORD, ILLINOIS.

IMPROVEMENT IN MECHANICAL MOVEMENTS.

Specification forming part of Letters Patent No. 164,413, dated June 15, 1875; application filed May 17, 1875.

CASE A.

*To all whom it may concern:*

Be it known that we, WILLIAM F. BARNES and JOHN BARNES, both of Rockford, in the county of Winnebago and State of Illinois, have invented certain new and useful Improvements in Mechanical Movements, of which the following is a specification:

Our invention relates to mechanical movements such as are used for converting an oscillating or treadle motion into a rotary motion, and it is more especially designed for driving scroll-saws, hand-lathes, and such other light machinery requiring a quick movement, its object being to furnish a simple and positive connection between the treadle or motor and the wheel to which the rotary motion is to be imparted.

The subject-matter claimed is hereinafter specifically designated.

In the accompanying drawings, which illustrate the best way now known to us of embodying our invention, Figure 1 is a vertical longitudinal central section; Fig. 2, a transverse section through the wheel-hub; Fig. 3, a side view.

The wheel or pulley A, to which the rotary motion is to be imparted, is loosely mounted upon a stud-axle or shaft, B. The hub of this wheel or pulley has cast with it an extended tubular portion, C, the periphery or surface of which is plain at $a$, and serrated or provided with ratchet-teeth at $a'$, the object of which will presently be explained. On this axle or shaft B, next to the extended portion of the wheel-hub, is also loosely mounted the mechanism through which motion is to be imparted to wheel A, which mechanism consists of a sleeve or thimble, D, provided with an annular rim, D', next to the hub extension. This annular rim D' has a raised nose or projection, $d$, on its periphery, to which is pivoted a pawl, F, which is adapted to catch into the teeth $a'$ on the periphery of the hub extension C. The action of this pawl F is controlled by means of a friction-arm, $g$, or its equivalent projecting from its side next to the wheel-hub, which operates upon the plain surface $a$ of said hub. On the projecting arm $g$, which in this instance is located on the ratchet near its bottom edge, a little back of the center, is a small friction-wheel, $g'$. An adjustable spring, I, is attached to the annular rim D' of the sleeve D, its free end bearing against the pawl to keep it in contact with the notched periphery of the extended portion of the hub.

In operation, an oscillating movement, or a movement in directions alternately opposite, is imparted to the sleeve or thimble by any suitable means, preferably by treadle-power, such as shown in Letters Patent No. 146,636, granted to WM. F. BARNES, January 20, 1874, and this motion is converted into a continuous rotary motion by the pawl on the sleeve engaging the teeth on the extended hub, it being brought into contact therewith by the friction of its projecting arm, which forces the pawl immediately down into the nearest notch.

By reversing the direction, or stopping the oscillating movement, of the thimble, the friction-arm will lift the pawl free of the notches and carry it in that position until motion is again to be imparted to the wheel or pulley.

By the construction above described it will be seen that an oscillating or treadle motion can be converted into a rotary one by direct acting mechanism which is extremely simple, and for the purpose is very desirable.

Instead of the hub extension being cast with the wheel it might be separately made and afterward attached, and other details of construction might be resorted to without departing from the spirit of our invention.

We claim—

1. The driven-wheel, constructed as described, with a ratchet-hub and a smooth surfaced annulus for the traverse of a friction-roller, substantially as set forth.

2. The driving mechanism hereinbefore described, consisting of the combination of the sleeve or thimble, its annular rim or flange, the pawl pivoted thereon, and the friction-roller carried by the pawl.

3. The mechanical movement hereinbefore described, consisting of the combination of a shaft, a driven-wheel mounted thereon, a driving-pulley or thimble, consisting of a flanged sleeve, a pawl pivoted on said flange, and a friction arm or roller carried by the pawl.

4. The combination, substantially as hereinbefore set forth, of the driving pulley or sleeve, a pawl pivoted thereon, and a guideway on the driven wheel, which throws the pawl out of gear on a backward movement of the driving-sleeve.

In testimony whereof, we have hereunto subscribed our names.

WILLIAM F. BARNES.
JOHN BARNES.

Witnesses:
PAUL F. HAYR,
CHRISTIAN HENERY.